(12) United States Patent
Kristiansen et al.

(10) Patent No.: US 9,654,285 B2
(45) Date of Patent: May 16, 2017

(54) DEFINING ACCESS RIGHTS TO CONTENT

(75) Inventors: Morten Kristiansen, Ratoath (IE);
Patrick Joseph O'Sullivan, Ballsbridge (IE); Hema Srikanth, Raleigh, NC (US); Timothy Joseph O'Flynn, Carpenterstown (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2204 days.

(21) Appl. No.: 12/430,372

(22) Filed: Apr. 27, 2009

(65) Prior Publication Data
US 2010/0275021 A1   Oct. 28, 2010

(51) Int. Cl.
*H04L 9/08* (2006.01)

(52) U.S. Cl.
CPC ............ *H04L 9/0836* (2013.01); *H04L 9/088* (2013.01); *H04L 2209/603* (2013.01)

(58) Field of Classification Search
CPC .. H04L 9/0836; H04L 9/088; H04L 2209/603
USPC .................................. 713/150, 163, 166
See application file for complete search history.

(56) References Cited

U.S. PATENT DOCUMENTS

| | | | | |
|---|---|---|---|---|
| 5,235,641 A * | 8/1993 | Nozawa et al. | ............ | 713/193 |
| 6,405,315 B1 * | 6/2002 | Burns et al. | ............ | 713/190 |
| 6,678,828 B1 * | 1/2004 | Pham et al. | ............ | 726/2 |
| 6,941,456 B2 * | 9/2005 | Wilson | ............ | 713/160 |
| 6,970,908 B1 * | 11/2005 | Larky et al. | ............ | 709/206 |
| 7,428,306 B2 * | 9/2008 | Celikkan et al. | ............ | 380/28 |
| 7,523,314 B2 * | 4/2009 | Spies et al. | ............ | 713/176 |
| 7,539,730 B2 * | 5/2009 | Adams et al. | ............ | 709/206 |
| 7,669,051 B2 * | 2/2010 | Redlich et al. | ............ | 713/166 |
| 7,730,142 B2 * | 6/2010 | LeVasseur et al. | ............ | 709/206 |
| 7,765,402 B2 * | 7/2010 | Clark et al. | ............ | 713/168 |
| 7,992,171 B2 * | 8/2011 | Amidon et al. | ............ | 725/50 |

* cited by examiner

*Primary Examiner* — Robert Leung
*Assistant Examiner* — Thomas Ho
(74) *Attorney, Agent, or Firm* — Cuenot, Forsythe & Kim, LLC

(57) ABSTRACT

A portion of text associated with a message intended for a group of recipients is encrypted at a computing device. The portion of text may include less than an entirety of the message. Access to the portion of text may be restricted for a first subset of the group of recipients and allowed for a second subset of the group of recipients.

20 Claims, 4 Drawing Sheets

Hi Team:

I would like to congratulate everyone on a terrific job this past year. As you know, our standard review process is currently taking place and we anticipate sitting down with each of you by the end of this month. Please let me know if you have any questions regarding this process.

Please provide me with your recommendations and feedback regarding the performance of Paul Pyscer, Cindi Sabra and John Patel as soon as possible. I have not had the opportunity to work with them directly and I would appreciate any insight that you could provide.

(150)

Thanks again for all of your hard work.

Brian

FIG. 2

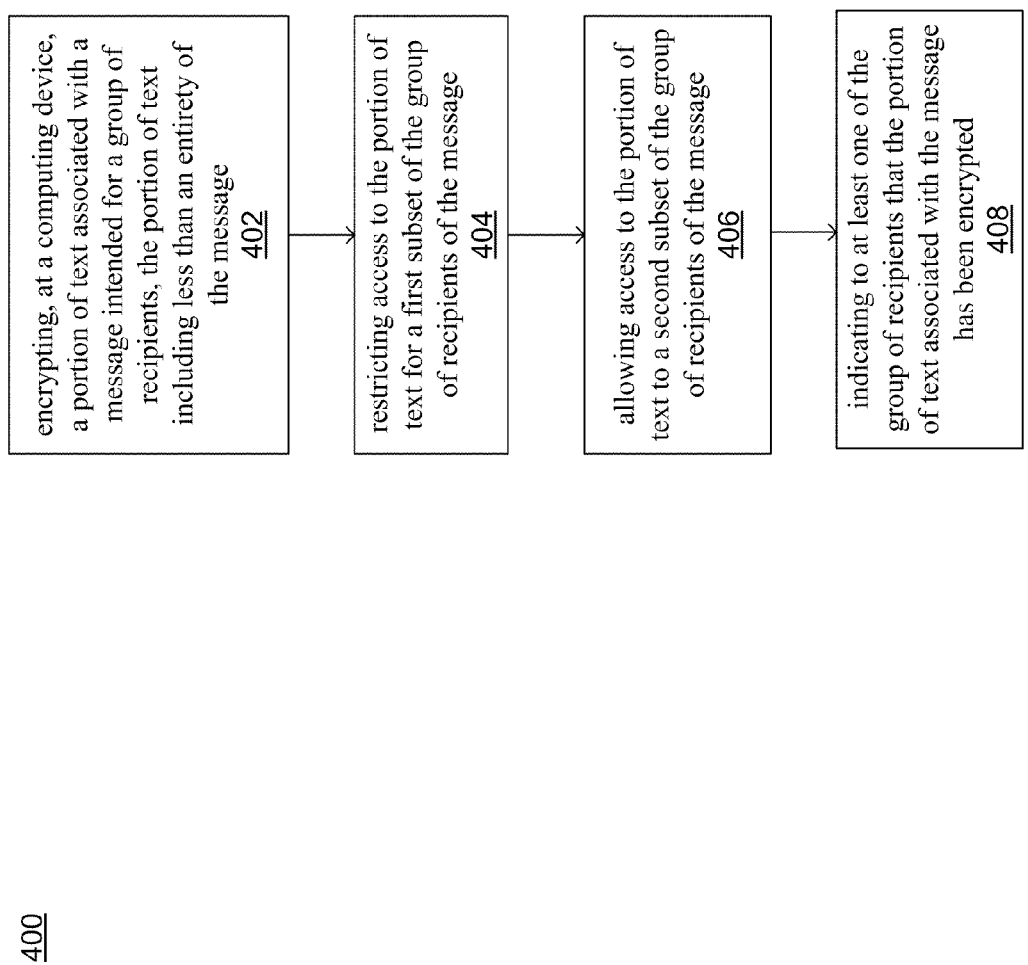

US 9,654,285 B2

DEFINING ACCESS RIGHTS TO CONTENT

BACKGROUND OF THE INVENTION

This disclosure relates to messages that include encrypted content and, more particularly, to a method for defining access rights to encrypted content.

Today, email may be used as a general tool for broad collaboration. Email has led to an explosion of messaging in which many people communicate and share content. However, the mechanisms that we have to send, receive and process email and the content contained therein do not lend themselves to collaboration. However, the mechanisms that we have to send, receive and process email do not lend themselves to successful collaboration in a broader context.

In corporate environments it is often the case that many different teams are involved in the production or completion of a product or other deliverable. Such teams may be linked together through an organizational structure where individual contributors report through managers and second line managers up to executives responsible for different aspects of the deliverable. For example, one team might be responsible for the initial design of a product, another team may be responsible for the implementation and yet a third one responsible for the marketing structure. Each of these teams may have more or less well defined areas of responsibility, and, depending on how well or how loose these responsibilities are defined might give rise to conflict and differences of opinion. For example, an individual contributor may feel that the direction given across organizational boundaries conflict with those given from the contributor's own direct reporting relationship.

In such a situation the topic that has given rise to conflict may be discussed inside the direct line of reporting with comments given in email and instant messaging communication that are unsuitable for sharing with all stakeholders.

BRIEF SUMMARY OF THE INVENTION

In a first implementation, a computer-implemented method may include encrypting a portion of text associated with a message intended for a group of recipients at a computing device, the portion of text including less than an entirety of the message. The method may further include restricting access to the portion of text for a first subset of the group of recipients of the message and allowing access to the portion of text for a second subset of the group of recipients of the message.

In a second implementation, a computer program product comprising a computer readable storage medium having computer readable program code embodied therewith is provided. The computer readable program code may include computer-readable program code configured to encrypt a portion of text associated with a message intended for a group of recipients, the portion of text including less than an entirety of the message. The computer readable program code may further include computer-readable program code configured to restrict access to the portion of text for a first subset of the group of recipients of the message and allow access to the portion of text for a second subset of the group of recipients of the message.

In a third implementation a computing system is provided. The computing system may include a processor and a memory architecture coupled with the processor. The computing system may also include a first software module executed on the processor and the memory architecture, wherein the first software module is configured to encrypt a portion of text associated with a message intended for a group of recipients, the portion of text including less than an entirety of the message. The computing system may further include a second software module executed on the at least one processor and the at least one memory architecture, wherein the second software module is configured to restrict access to the portion of text for a first subset of the group of recipients of the message and allow access to the portion of text for a second subset of the group of recipients of the message.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 2 is a diagrammatic view of a display screen rendered by the access process and/or email client application of FIG. 1;

FIG. 4 is a flowchart depicting operations in accordance with the access process described herein.

Like reference symbols in the various drawings may indicate like elements.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Figure 1:
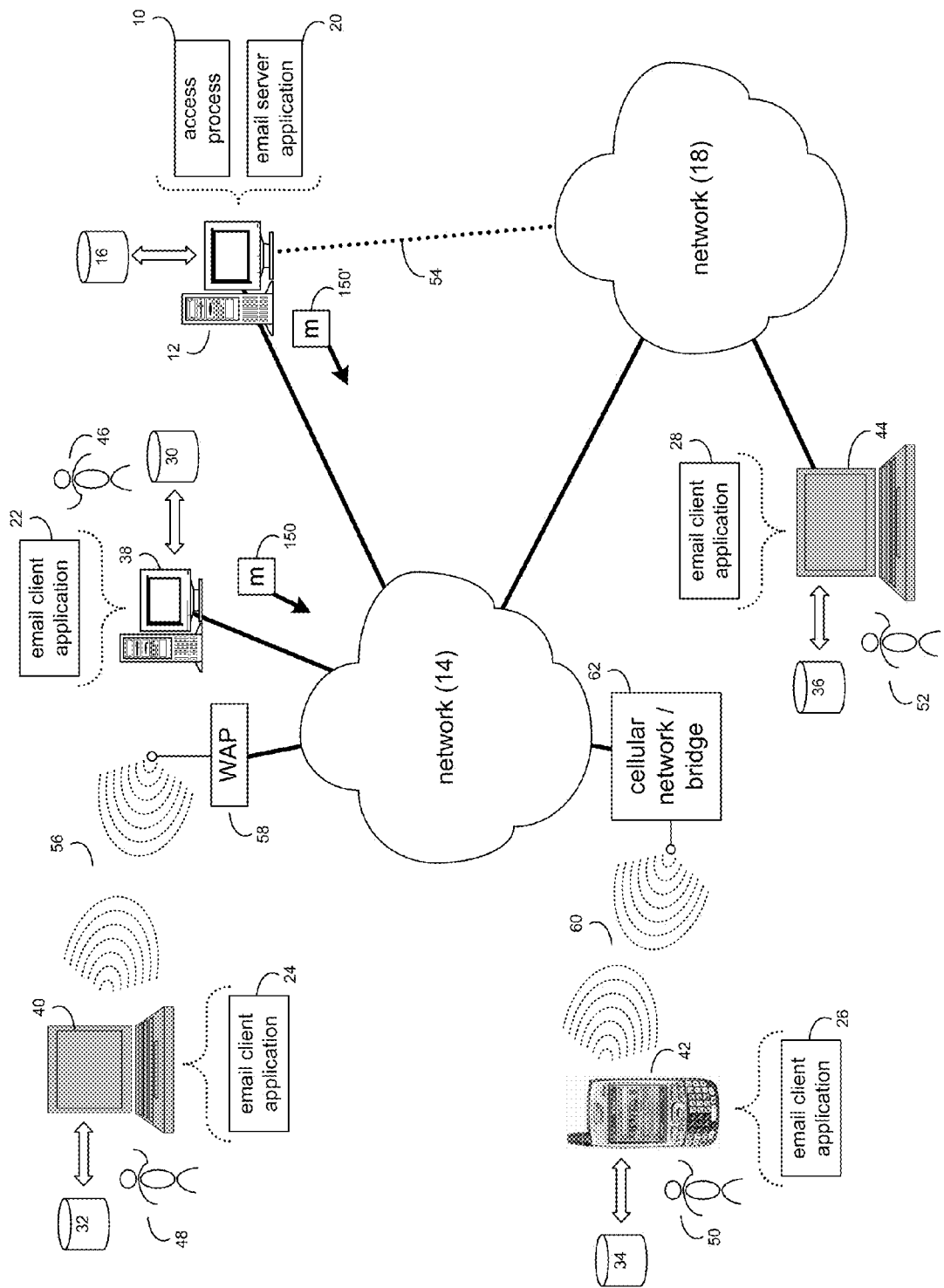
FIG. 1 is a diagrammatic view of an access process and an email client application coupled to a distributed computing network.

Referring to FIG. 1, there is shown access process 10 that may reside on and may be executed by server computer 12, which may be connected to network 14 (e.g., the Internet or a local area network). Although access process 10 is shown residing on server computer 12, it should be noted that this is merely one exemplary embodiment of the subject application. Accordingly, access process 10 may reside upon any or all of client devices 38, 40, 42, 44.

Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example.

As will be discussed below in greater detail, access process 10 may include encrypting a portion of text associated with a message intended for a group of recipients at a computing device, the portion of text including less than an entirety of the message. Access process 10 may further include defining access rights to the portion of text to a subset of the group of recipients of the message.

The instruction sets and subroutines of access process 10, which may be stored on storage device 16 coupled to server computer 12, may be executed by one or more processors (not shown) and one or more memory architectures (not shown) incorporated into server computer 12. Storage device 16 may include, but is not limited to, a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include, but are not limited to, a local area network; a wide area network; or an intranet, for example.

Server computer 12 may execute email server application 20, examples of which may include, but are not limited to, e.g., IBM® Lotus® Domino® Server and Microsoft Exchange® Server (IBM, Lotus, and Domino are registered trademarks of International Business Machines Corporation in the United States, other countries or both; Exchange is a registered trademark of Microsoft Corporation in the United States, other countries or both). Email server application 20 may be a mail transfer agent that may store and route email to one or more email client applications 22, 24, 26, 28, examples of which may include but are not limited to Lotus Notes® and Microsoft Outlook® (Lotus Notes is a registered trademark of International Business machines Corporation in the United States, other countries, or both; and Outlook is a registered trademark of Microsoft Corporation in the United States, other countries, or both). Access process 10 may be a stand alone application that interfaces with email server application 20 or an applet/application that is executed within email server application 20.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include, but are not limited to, hard disk drives, tape drives, optical drives, RAID arrays, random access memories (RAM), read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

This disclosure is directed towards an access process 10 configured to encrypt a portion of text associated with a message intended for a group of recipients at a computing device. The portion of text may include less than the entirety of the message. Access process 10 may also include defining access rights to the portion of text to a subset of the group of recipients.

Access process 10 may be a server-side process, a client-side process, or a hybrid server-side/client-side process. Accordingly and for the following disclosure, access process 10 shall collectively refer to any and all combinations of server-side access process 10 and/or client-side access processes.

For example, server-side access process 10 may reside on and may be executed by server computer 12, which may be connected to network 14 (e.g., the Internet or a local area network). Examples of server computer 12 may include, but are not limited to, a personal computer, a server computer, a series of server computers, a mini computer, and a mainframe computer. Server computer 12 may be a web server (or a series of servers) running a network operating system, examples of which may include but are not limited to, Microsoft Windows, Microsoft Windows CE®, Red Hat Linux, or a custom operating system (Windows CE is a registered trademark of Microsoft Corporation in the United States, other countries, or both).

For the following discussion, email client application 22 is going to be described for illustrative purposes. However, this is not intended to be a limitation of this disclosure, as other email client applications (e.g., email client applications 24, 26, 28) may be equally utilized.

Access process 10 may allow a user to send a message to a group of recipients and to allow selective encryption of portions of the message based on user-defined permissions that may be specified at the individual, group, social network, or corporate level (e.g. lightweight directory access protocol "LDAP"). Although much of the discussion included herein is in the context of an email message, it should be noted that the term "message" as used herein, may refer to any type of digital message, including, but not limited to, email, calendar invitations, etc.

Referring also to FIG. 2, email client application 22 (alone or in combination with access process 10 and/or email server application 20) may allow a user (e.g., user 46) to generate email message 150 that is addressed to one or more recipients. Email message 150 may be addressed to "TO" recipients 152, "CC" (i.e., carbon copy) recipients 154, and "BCC" (i.e., blind carbon copy) recipients 156. Further, email message 150 may include message content 158 (i.e., the body of the email message).

In some embodiments, access process 10 may be configured to encrypt a portion of text 160 associated with email message 150. More specifically, access process 10 may allow a user (e.g. user 46) to select portion of text 160 within message content 158 for encryption. Access process 10 may then encrypt the selected portion and define access rights for certain individuals in the group of recipients (i.e. a subset) to access the selected portion. Access process 10 may restrict a first subset of the group of recipients from accessing portion of text 160 and allow a second subset of the group of recipients to access portion of text 160. For example, user 46 may compose message 150 using access process 10 restricts user 48 from accessing portion of text 160 while allowing user 50 to access portion of text 160. In some embodiments, encrypted portion of text 160 may propagate and persist with message 150 for all subsequent threads.

Figure 3:
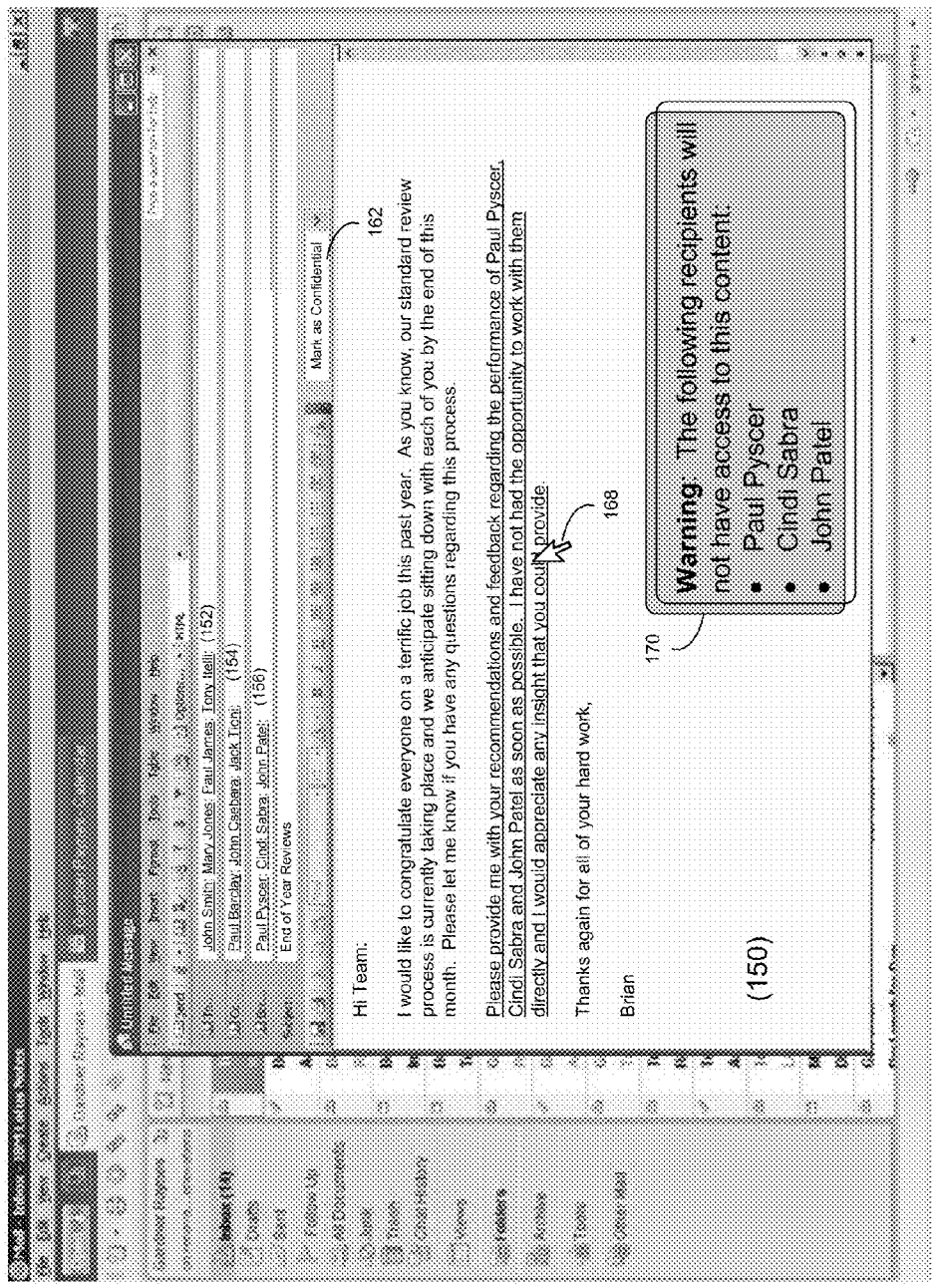
FIG. 3 is a diagrammatic view of a display screen rendered by the access process and/or email client application of FIG. 1.

As shown in FIG. 2, the user may highlight portion of text 160 using a number of suitable techniques. For example, the user may select the portion of text using a pointer (as shown in FIG. 3) or similar feature. The encryption option may also be selected via drop-down menu 162 or other techniques, including but not limited to, selecting a button associated with email application 22, using a right-click activation, etc. Once selected, access process 10 may then work alone or in conjunction with email application 22 to encrypt portion of text 160. The user may then select the individual recipients from within the group of recipients who may be permitted to access encrypted portion of text 160. Access process 10 may then define the access rights for encrypted portion of text 160 for a subset of the group of recipients.

In some embodiments, the encryption may occur before, during, or after the transmission of message 150 to the group of recipients. This encryption may utilize a public key so that only those recipients having the appropriate private key may be able to decrypt portion of text 160 for display.

In some embodiments, some or all of the recipients may be able to determine that portion of text 160 was encrypted. Moreover, some or all of the recipients may receive an indicator warning that may identify the recipients of message 150 who are unable to access portion of text 160. Access process 10 may also be configured to display the names of these recipients as well as to identify encrypted portion of text 160. In some embodiments, access process 10 may provide a preview to the message originator, thus allowing the sender of the message to view the message as it would be displayed to any or all of the group of recipients (e.g., as displayed to both those with and without access to portion of text 160).

In some embodiments, access process 10 may utilize any of a number of different encryption methods, including, but not limited to, integrated public key infrastructure (PKI), Secure/Multipurpose Internet Mail Extensions (S-Mime), and other suitable encryption methods. For example, the originator of the message may retrieve the public key from the PKI system and encrypt the sensitive portions of the message using the obtained public keys. Once received, the recipient of the message may determine that a portion of the message has been encrypted and that additional action may be required to decrypt the portion. Alternatively, access process 10 may automatically decrypt the encrypted portion using the recipient's private key, which may be obtained via the PKI system.

For example, in operation, the originator or composer of the message (e.g., user 46) may open email client application 22 on computing device 38 as shown in FIG. 2. User 46 may then open a received message in his/her email inbox and choose to forward the message as is known in the art. User 46 may then highlight portion of text 160 that he/she determines to be sensitive using the techniques described above. Once the text has been selected, user 46 may activate the encryption feature using any suitable technique. Access process 10 may then allow user 46 with an option to provide access to the encrypted text to a subset of the group of recipients 164 of message 150.

For example, user 46 may determine that John Smith, Mary Jones, Paul James, Tony Itelli, Paul Barclay, John Csebara, and Jack Tioni may be a subset 166 of group of recipients 164 that he/she wishes to grant access to encrypted text 160. Here, in addition to the subset, the group of recipients may also include, Paul Pyscer, Cindi Sabra, and John Patel. However, user 46 may wish to shield portion of text 160 from these three individuals. Access process 10 may then retrieve the public key of each of the addresses in the addressee list for each of the members of subset 166. Access process 10 may then add the address of each of the recipients of the confidential information to the address fields of email application 22, for example "TO" recipients 152 and "CC" recipients 154. User 46 may add additional recipients to the message as desired, however, these recipients may not be able to access portion of text 160. Once user 46 activates the send action, the message may be submitted via email application 22 through network 14 to group of recipients 164. The group of recipients 164 including members of subset 166 may then receive and/or open message 150.

For example, John Smith (e.g. user 48) being a member of subset 166 may receive and/or open message 150 to gain access to portion of text 160. Using email client application 24, portion of text 160 may then be decrypted. This decryption may utilize the private key maintained for user 48 and may occur automatically, or alternatively, upon a manual selection by user 48. Email client application 24 may then provide visual indicator 170 (shown in FIG. 3) that portions of message 150 are only available to a select number of group of recipients 164. In some embodiments, the user may place a pointer 168 or other selection tool over portion of text 160, other portions of message 150 and/or visual indicator 170 in order to display group of recipients 164 as well as the members of subset 166. In contrast, Paul Pyscer being a member of group of recipients 162, but not subset 166 may receive message 150 in his inbox and open it without being able to access portion of text 160.

In some embodiments, the encryption may be performed using a public key and defining access rights to the encrypted portion may include providing a private key to members of subset 166 of group of recipients 164. Access process 10 may be further configured to indicate to at least one of group of recipients 164 that portion of text 160 associated with the message has been encrypted.

In some embodiments, access process 10 may be configured to operate in accordance with an organizational hierarchy. The organizational hierarchy may include a corporate directory or similar feature that may map the reporting lines and organizational relationships between employees of a company. For example, in some embodiments, a lightweight directory access protocol (LDAP) or similar application protocol may be used to query and/or modify a hierarchical directory structure. Access process 10 may communicate with LDAP to determine the correct group of recipients, or subset of the group, who may have access to a message based upon the directory structure maintained by the LDAP.

In operation, a sender may open their email client application, for example email client application 26. The sender may then open a received message and activate the forwarding action. Alternatively, the sender may choose to create a new message. If the sender wishes to encrypt a portion of the email message, he/she may highlight the sensitive information as described above and activate the encryption action. Access process 10 and/or email client application 26 may then present the sender with a dialog to confirm the identity of the subset of the group of recipients that may have access to the sensitive information. In this embodiment, an organizational look-up feature may allow the sender to find the organizational unit (represented by the individuals heading up the unit) that may have access to the sensitive information. The look-up may rely on the information in the corporate directory and may be accessed, for example, using drop-down menu 162, right-click activation, and/or using any other suitable technique. Once the organizational unit has been selected the sender may specify whether the access applies to all the employees in the unit or whether the access only applies to the direct line from the sender to the executive or director heading up the unit. The email client application, e.g., email client application 26, may store the organizational information, which makes up the access control along with the message. The sender may then specify the addresses of the group of recipients and activate the send action, thus submitting the message to email client application for delivery to the subset of the group of recipients. As discussed above, the email client application may then encrypt the sensitive information included in the message.

A member of the subset may then receive and subsequently open the message. The recipient's email client application may then look up the recipient in the corporate directory and match the information with the organizational access control stored in the message. If the recipient is included in the organization that has been given access the encrypted confidential information may be displayed. The recipient's email client application may provide a visual indicator that portions of the message are only available to a select number of recipients. The recipient may place a selection tool, such as a pointer over the encrypted portion of the message, the message itself, and/or the visual indicator, and as a result, the email client application may display information about the organizational unit that was given access to the encrypted content. In contrast, a recipient that does not have access to the encrypted content may receive the message and open it. Access process 10 may then look up the recipient in the corporate directory and match the information with the organizational access control stored in the message. However, as the recipient is not included within the organization that has been given access to the encrypted confidential information, this information is not visible to this particular recipient.

In some embodiments, access process 10 may be configured to operate in accordance with a social networking system. The social networking system may be capable of mapping, for example, the user's $1^{st}$, $2^{nd}$, and $3^{rd}$ levels of interaction relationships between the users of the email network based on the frequency and nature of their interactions. One exemplary social networking system is Linkedin®, which may utilize a gated access approach to connect different users through various levels of relationships (LinkedIn® is a registered trademark of Linkedin Corp. in the United States, other countries, or both).

In operation, a sender may open their email client application, for example email client application 26. The sender may then open a received message and activate the forwarding action. Alternatively, the sender may choose to create a new message. If the sender wishes to encrypt a portion of the email message, he/she may highlight the sensitive information as described above and activate the encryption action. Access process 10 and/or email client application may then present the sender with a dialog to confirm the identity of the subset of the group of recipients that may have access to the sensitive information. In this embodiment, a social networking system may be provided. The social networking lookup system may allow a sender to specify whether access is granted to people who are part of the sender's $1^{st}$, $2^{nd}$, or $n^{th}$ level of relationship. Email client application 26 may then store information that allows the recipient's messaging program to determine the access control that is to be applied to the message. The sender may then specify the addresses of the recipients and activate the send action, thus submitting the message to email client application 26 for delivery to the chosen recipients. Access process 10 in conjunction with email client application 26 may then encrypt a portion of text (e.g. 160) included within the message. A recipient intended to have access to all of the message content may then receive the message in his/her inbox and subsequently open the message. The email client application of the recipient, for example email client application 24 of user 48, may then look up user 48 in the social networking system and match the information with the access control stored in the received message. If user 48 is included in the nth degree relationship specified the confidential information may be displayed. For example, the sender of the message may specify that the message may only be suitable for contacts in his/her $1^{st}$ relationship level. Therefore, only recipients of the message having that level may be capable of accessing the encrypted confidential information. Alternatively, if the recipient is not included in the selected relationship level (e.g., $2^{nd}$ relationship level), the recipient may receive the message and open it, before email client application contacts social networking system to match the information with the access control stored within the message. However, in this example, as the recipient is not included in the relationship level selected by the sender the encrypted information may not be visible to the recipient.

As discussed above, email client application may provide a visual indicator that portions of the message are only available to a select number of recipients. For example, a user may place the mouse over the message, portion of text, visual indicator and email client application may display information about the portion of the social network that was given access to all the content.

In some embodiments, access process 10 may allow an email originator to provide an importance rating to aspects of their message. For example, a score of 1-10 may be used to indicate relative importance. The recipient may have configured their system to display items that have been flagged as, e.g. >7, which may result in filtering the less important content. This filtering could take any of a number of different forms, including, but not limited to greying out, pushing into the background, etc.

Referring now to FIG. 4, a method 400 in accordance with access process 10 is provided. Method 400 may include encrypting a portion of text associated with a message intended for a group of recipients at a computing device, the portion of text including less than an entirety of the message (402). The method may further include restricting access to the portion of text for a first subset of the group of recipients of the message (404). The method may also include allowing access to the portion of text to a second subset of the group of recipients of the message (406). In some embodiments, method 400 may additionally include indicating to at least one of the group of recipients that the portion of text associated with the message has been encrypted (408). Numerous additional operations are also envisioned without departing from the scope of the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims. For example, and as discussed above, although most of the discussion contained herein has focused upon email messages, this disclosure is not limited to these examples, as the access process described herein may be applied to calendar invitations and various other forms of messaging.

What is claimed is:

1. A computer-implemented method comprising:
encrypting, at a computing device, a portion of text associated with a message intended for a group of recipients, wherein the portion of text includes less than an entirety of the message;
restricting access to the portion of text for a first subset of the group of recipients of the message; and
allowing access to the portion of text to a second subset of the group of recipients of the message, wherein
the message includes a textual secondary message indicating that the portion of text has been encrypted.

2. The computer-implemented method of claim 1 wherein the computing device is associated with a composer of the message.

3. The computer-implemented method of claim 2 wherein at least one of restricting and allowing is determined by the computing device prior to transmission of the message.

4. The computer-implemented method of claim 1 wherein the message is at least one of an email message and a calendar invitation.

5. The computer-implemented method of claim 1 wherein the group of recipients is associated with at least one of an organizational hierarchy and a social network.

6. The computer-implemented method of claim 1 wherein encrypting is performed using a public key and defining access rights includes providing a private key to the subset of the group of recipients.

7. The computer-implemented method of claim 1 wherein encrypting the portion of text is performed by at least one of a server-side device and a client-side device.

8. The computer-implemented method of claim 1, wherein
the textual secondary messages identifies members of the first subset of the group.

9. A computer program product, comprising:
a computer readable hardware storage device having computer readable program code embodied therewith, the computer readable program code comprising:
computer-readable program code configured to encrypt a portion of text associated with a message intended for a group of recipients, the portion of text including less than an entirety of the message;
computer-readable program code configured to restrict access to the portion of text for a first subset of the group of recipients of the message; and
computer-readable program code configured to allow access to the portion of text to a second subset of the group of recipients of the message, wherein
the message includes a textual secondary message indicating that the portion of text has been encrypted.

10. The computer program product of claim 9 wherein the computing device is associated with a composer of the message.

11. The computer program product of claim 10 wherein at least one of restricting and allowing is determined by the computing device prior to transmission of the message.

12. The computer program product of claim 9 wherein the message is at least one of an email message and a calendar invitation.

13. The computer program product of claim 9 wherein the group of recipients is associated with at least one of an organizational hierarchy and a social network.

14. The computer program product of claim 9 wherein encrypting is performed using a public key and defining access rights includes providing a private key to the subset of the group of recipients.

15. The computer program product of claim 9 wherein encrypting the portion of text is performed by at least one of a server-side device and a client-side device.

16. The computer program product of claim 9, wherein
the textual secondary messages identifies members of the first subset of the group.

17. A computing system comprising:
at least one processor;
at least one memory architecture coupled with the at least one processor;
a first software module executed on the at least one processor and the at least one memory architecture, wherein the first software module is configured to encrypt a portion of text associated with a message intended for a group of recipients, the portion of text including less than an entirety of the message;
a second software module executed on the at least one processor and the at least one memory architecture, wherein the second software module is configured to restrict access to the portion of text for a first subset of the group of recipients of the message; and
a third software module executed on the at least one processor and the at least one memory architecture, wherein the third software module is configured to allow access to the portion of text to a second subset of the group of recipients of the message, wherein
the message includes a textual secondary message indicating that the portion of text has been encrypted.

18. The computing system of claim 17 wherein the group of recipients is associated with at least one of an organizational hierarchy and a social network.

19. The computing system of claim 17 further comprising indicating to at least one of the group of recipients that the portion of text associated with the message has been encrypted.

20. The computing system of claim 17 wherein
the textual secondary messages identifies members of the first subset of the group.

\* \* \* \* \*